US009677760B2

(12) United States Patent
Hirano

(10) Patent No.: US 9,677,760 B2
(45) Date of Patent: Jun. 13, 2017

(54) FURNACE HEATING COMBUSTION APPARATUS

(75) Inventor: Makoto Hirano, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 753 days.

(21) Appl. No.: 13/981,751

(22) PCT Filed: Jan. 28, 2011

(86) PCT No.: PCT/JP2011/051750
§ 371 (c)(1),
(2), (4) Date: Oct. 10, 2013

(87) PCT Pub. No.: WO2012/101814
PCT Pub. Date: Aug. 2, 2012

(65) Prior Publication Data
US 2014/0041559 A1   Feb. 13, 2014

(51) Int. Cl.
*F23D 14/58*      (2006.01)
*F23D 14/22*      (2006.01)
(Continued)

(52) U.S. Cl.
CPC .............. *F23D 14/22* (2013.01); *F23C 6/045* (2013.01); *F23C 7/008* (2013.01); *F23D 14/56* (2013.01);
(Continued)

(58) Field of Classification Search
CPC .......... F23D 14/22; F23D 14/56; F23D 14/62; F23D 14/66; F23D 2900/11402;
(Continued)

(56) References Cited

U.S. PATENT DOCUMENTS

| 1,163,650 | A | * | 12/1915 | Fogler | F23C 3/00 |
| | | | | | 110/104 R |
| 3,154,134 | A | * | 10/1964 | Bloom | F23C 7/008 |
| | | | | | 239/416.5 |

(Continued)

FOREIGN PATENT DOCUMENTS

| CN | 1386180 A | 12/2002 |
| CN | 1754064 A | 3/2006 |

(Continued)

OTHER PUBLICATIONS

"EP_1195557_A1_M—Machine Translation.pdf", EPO, Mar. 7, 2016.*

(Continued)

*Primary Examiner* — Gregory Huson
*Assistant Examiner* — Daniel E Namay
(74) *Attorney, Agent, or Firm* — The Webb Law Firm

(57) ABSTRACT

A furnace-heating combustion apparatus that allows adjustment of a ratio between the amount of primary air and the amount of secondary air. A double-tube elongate burner extends through a rear wall portion of an air box disposed away from a furnace wall. The leading end portion of the burner is disposed inside a tube section such that a secondary air conduit is formed between an outer circumferential face of the leading end portion and an inner circumferential face of the tube section. A primary air conduit is provided at the leading end portion of the burner to introduce the air inside the air box from the rear end portion and cause it to flow toward the leading end portion. A burner supporting means is provided for to allow adjustment of the position of the burner in the longitudinal direction relative to the rear wall of the air box.

9 Claims, 5 Drawing Sheets

(51) Int. Cl.
| | | |
|---|---|---|
| *F23L 9/00* | (2006.01) | |
| *F23C 7/00* | (2006.01) | |
| *F23C 6/04* | (2006.01) | |
| *F23L 15/04* | (2006.01) | |
| *F23D 14/62* | (2006.01) | |
| *F23D 14/66* | (2006.01) | |
| *F23L 13/00* | (2006.01) | |
| *F23L 1/00* | (2006.01) | |
| *F23D 14/56* | (2006.01) | |

(52) U.S. Cl.
CPC ............ *F23D 14/62* (2013.01); *F23D 14/66* (2013.01); *F23L 1/00* (2013.01); *F23L 9/00* (2013.01); *F23L 13/00* (2013.01); *F23L 15/04* (2013.01); *F23C 2201/20* (2013.01); *F23D 2900/11402* (2013.01); *Y02E 20/348* (2013.01)

(58) Field of Classification Search
CPC ..... F23L 1/00; F23L 13/00; F23L 9/00; F23L 15/04; F23C 6/045; F23C 7/008; F23C 2201/20
USPC .... 126/99 R, 110 R, 110 C, 116 A, 117, 112
IPC ........... F23D 14/22, 14/58, 14/64; F23L 13/06, 9/00; F23C 7/00
See application file for complete search history.

(56) References Cited

U.S. PATENT DOCUMENTS

| | | | | |
|---|---|---|---|---|
| 3,723,049 | A * | 3/1973 | Juricek | F23C 7/004 181/226 |
| 3,807,940 | A * | 4/1974 | Juricek | B01F 5/0405 239/423 |
| 4,412,808 | A * | 11/1983 | Sheppard | F23D 11/12 239/397.5 |
| 4,797,087 | A * | 1/1989 | Gitman | B05B 7/0861 239/423 |
| 5,090,339 | A | 2/1992 | Okiura et al. | |
| 5,217,363 | A * | 6/1993 | Brais | F23D 14/22 239/401 |
| 5,567,141 | A * | 10/1996 | Joshi | F23D 11/106 239/419 |
| 5,692,678 | A * | 12/1997 | Ishibashi | F23D 14/22 239/425 |
| 5,743,723 | A * | 4/1998 | Iatrides | F23D 1/00 431/12 |
| 5,772,427 | A * | 6/1998 | Laurenceau | C03B 5/235 431/154 |
| 5,934,893 | A * | 8/1999 | Laurenceau | C03B 5/235 431/154 |
| 6,132,204 | A * | 10/2000 | Snyder | C03B 5/235 239/549 |
| 6,190,158 | B1 * | 2/2001 | Legiret | F23D 14/22 431/12 |
| 6,193,173 | B1 * | 2/2001 | Bodelin | C03B 5/235 148/325 |
| 6,233,974 | B1 * | 5/2001 | Anderson | C03B 5/2353 65/134.4 |
| 6,332,340 | B1 * | 12/2001 | Bodelin | C03B 5/235 431/126 |
| 6,334,770 | B1 * | 1/2002 | Giraud | C21D 9/0006 431/165 |
| 6,715,432 | B2 | 4/2004 | Tsumura et al. | |
| 7,028,622 | B2 * | 4/2006 | Taylor | F23C 6/045 110/263 |
| 8,584,605 | B2 * | 11/2013 | Taylor | F23C 6/045 110/261 |
| 9,353,941 | B2 * | 5/2016 | Taylor | F23C 6/045 |
| 2002/0039711 | A1 | 4/2002 | Rio et al. | |
| 2003/0008255 | A1 * | 1/2003 | Finke | F23C 9/006 431/215 |
| 2004/0074427 | A1 * | 4/2004 | Kobayashi | F23C 5/32 110/347 |
| 2004/0194681 | A1 * | 10/2004 | Taylor | F23C 6/045 110/261 |
| 2005/0026099 | A1 * | 2/2005 | Masi | F23D 11/108 431/187 |
| 2005/0132941 | A1 * | 6/2005 | Taylor | F23C 6/045 110/265 |
| 2006/0057516 | A1 * | 3/2006 | Miller | F23C 3/002 431/8 |
| 2006/0183067 | A1 | 8/2006 | Kokuo et al. | |
| 2007/0054227 | A1 | 3/2007 | Tada et al. | |
| 2008/0113309 | A1 | 5/2008 | Takashima et al. | |
| 2008/0131827 | A1 * | 6/2008 | Birle | F23C 5/06 431/159 |
| 2010/0035193 | A1 * | 2/2010 | Davis | F23C 6/045 431/2 |
| 2010/0081103 | A1 * | 4/2010 | Kobayashi | C03B 5/235 432/1 |
| 2010/0089066 | A1 * | 4/2010 | Mina | F23D 1/06 60/772 |
| 2010/0233639 | A1 * | 9/2010 | Richardson | F23C 7/02 431/8 |
| 2010/0330510 | A1 * | 12/2010 | Pfefferle | F23C 13/06 431/8 |
| 2013/0269577 | A1 * | 10/2013 | Taylor | F23C 6/045 110/265 |
| 2016/0245505 | A1 * | 8/2016 | Taylor | F23C 6/045 |

FOREIGN PATENT DOCUMENTS

| | | |
|---|---|---|
| CN | 1759273 A | 4/2006 |
| CN | 101178176 A | 5/2008 |
| CN | 101672475 A | 3/2010 |
| EP | 1195557 A1 | 4/2002 |
| EP | 01306614 A1 | 5/2003 |
| JP | 51108154 | 2/1975 |
| JP | 5324933 | 8/1976 |
| JP | 5551471 | 9/1978 |
| JP | 59056010 A * | 3/1984 |
| JP | 60126997 U | 8/1985 |
| JP | 1139915 A | 6/1989 |
| JP | 350408 A | 3/1991 |
| JP | 8226619 A | 9/1996 |
| JP | 2001263619 A | 9/2001 |
| JP | 200213704 A | 1/2002 |
| JP | 2003262305 A | 9/2003 |
| JP | 200555083 A | 3/2005 |
| JP | 2010112652 A | 5/2010 |
| WO | 2008092763 A1 | 8/2008 |

OTHER PUBLICATIONS

"WO_2008092763_A1—Machine Translation.pdf", EPO, Mar. 7, 2016.*

* cited by examiner

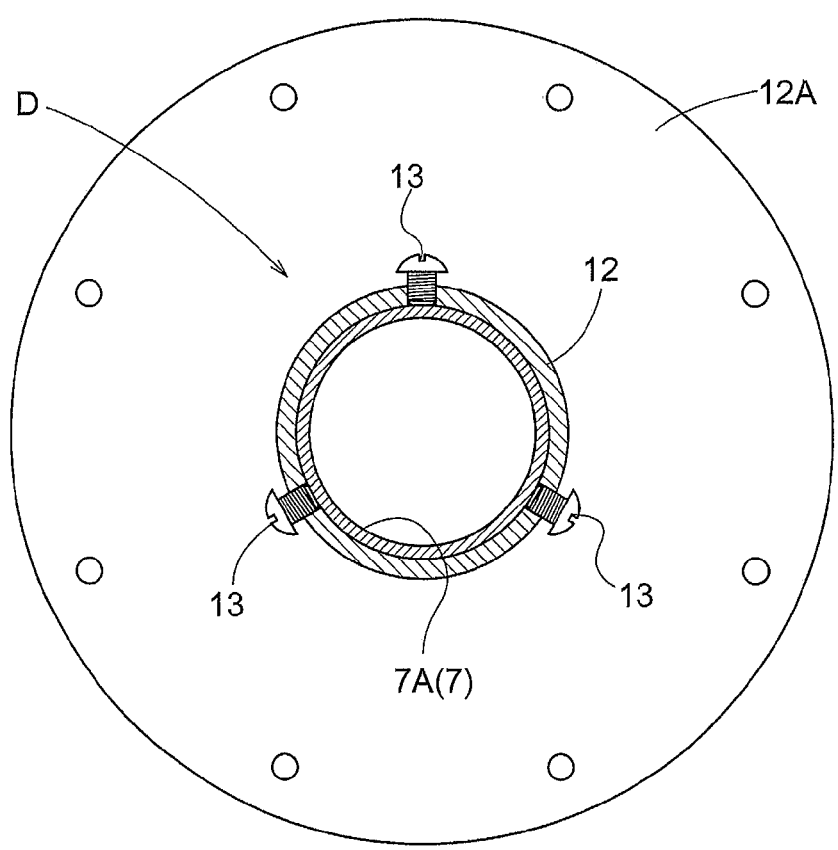

FURNACE HEATING COMBUSTION APPARATUS

CROSS-REFERENCE TO RELATED APPLICATIONS

This application is the United States national phase under 35 U.S.C. §371 of International Application No. PCT/JP2011/051750 filed Jan. 28, 2011, entitled "Furnace-Heating Combustion Apparatus", the disclosure of which is hereby incorporated by reference in its entirety.

BACKGROUND OF THE INVENTION

Technical Field

The present invention relates to a furnace-heating combustion apparatus comprising: an air box connected to a furnace wall to be communicated with a flame passing hole formed in the furnace wall, the air box including a cylindrical tube section on the side of the furnace wall and receiving supply of combustion air from a combustion air supplying means; and an elongate burner in the form of a double-tube having, at the center portion thereof, a fuel conduit for flowing gas fuel and having, at the outer circumferential portion thereof, a primary air conduit for flowing primary air, the elongate burner being provided to extend through a rear wall portion of the air box disposed away from the furnace wall, wherein a leading end portion of the burner is disposed inside the air box in such a manner that a secondary air conduit for flowing air present inside the air box as secondary air is formed between the outer circumferential face of the leading end portion of the burner and an inner circumferential face of the tube section.

Background Art

Such furnace-heating combustion apparatus as described above is for use in heating various types of furnaces such as a melting furnace for melting an object to be melted such as glass, metal or the like or a heating furnace for heating an object to be heated such as a forged article.

As an example of such furnace-heating combustion apparatus as above, there is known one configured as follows. In this known apparatus, the burner includes a fuel-supply tubular body provided along the whole length of the burner and forming a fuel conduit and an air-supply tubular body disposed to surround an area from a position located outside an air box to a leading end portion and forming a primary air conduit between the fuel-supply tubular body and the air-supply tubular body and forming also a secondary air conduit between the air-supply tubular body and a tube section of the air box. And, an amount of combustion air from a blower as a combustion air supplying means is supplied to the air box and also to a portion of the air-supply tubular body located outside the air box (see e.g. Japanese Unexamined Patent Application Publication No. 2002-13704 (FIGS. 1 through 3).

SUMMARY OF THE INVENTION

Object to be Achieved by Invention

With the conventional furnace-heating combustion apparatus, the burner portion located outside the air box of the burner is provided as a double-tube construction having a large diameter. Hence, the apparatus suffers the inconvenience of requiring large space for its installation. Further, as the combustion air from the blower is supplied not only to the air box, but also to the portion of the air-supply tubular body which is located outside the air box, the apparatus suffers the further inconveniences of the configuration for supplying combustion air to the burner being complicated and of requiring large installment space outside the furnace.

Namely, the space outside the furnace is to be utilized for various purposes, e.g. as a working space for effecting a maintenance work or the like. Hence, it is desired that various devices or components to be disposed in this space be formed compact. Yet, with the conventional furnace-heating combustion apparatus, the configuration is complicated and also it requires large installment space outside the furnace. Hence, there is a need for its compactization.

Moreover, with such furnace-heating combustion apparatus as above, there is a desire for possibility of adjustment of a ratio between the amount of primary air flowing through a primary air conduit and the amount of secondary air flowing through a secondary air conduit for allowing adjustment of combustion-flame forming state. For instance, it desired to be able to switch over the state of combustion according to the use situation, between a combustion state wherein gas fuel discharged from the fuel conduit is used for a primary combustion sufficiently with a sufficient amount of primary air and for a secondary combustion with a second air and a further combustion state wherein the fuel gas is used for a primary combustion with relatively less amount of primary air and for a secondary combustion sufficiently with a secondary air.

And, with the conventional furnace-heating combustion apparatus, in order to provide the above ability to adjust the ratio between the amount of primary air flowing through the primary air conduit and the amount of secondary air flowing through the secondary air conduit, this was realized in general by provide an air-flow adjusting damper in a conduit for supplying the combustion air from the blower to the air box or in a conduit for supplying the combustion air from the blower to the air-supply tubular body. However, if the damper is to be provided as above, this would lead to further increase in the installment space outside the furnace.

The present invention has been made in view of the above-described state of the art and its object is to provide a furnace-heating combustion apparatus that allows adjustment of a ratio between the amount of primary air flow flowing through a primary air conduit and the amount of secondary air flow flowing through a secondary air conduit and that also allows simplification of its configuration as well as reduction in its installment space outside the furnace.

Means for Achieving the Object

A furnace-heating combustion apparatus according to the present invention comprises:

an air box connected to a furnace wall to be communicated with a flame passing hole formed in the furnace wall, the air box including a cylindrical tube section on the side of the furnace wall and receiving supply of combustion air from a combustion air supplying means; and an elongate burner in the form of a double-tube having, at the center portion thereof, a fuel conduit for flowing gas fuel and having, at the outer circumferential portion thereof, a primary air conduit for flowing primary air, the elongate burner being provided to extend through a rear wall portion of the air box disposed away from the furnace wall;

wherein a leading end portion of the burner is disposed inside the air box in such a manner that a secondary air conduit for flowing air present inside the air box as secondary air is formed between the outer circumferential face of the leading end portion of the burner and an inner circumferential face of the tube section;

wherein the primary air conduit included in the burner is provided at the leading end portion of the burner in such a manner as to introduce the air present inside the air box and cause it to flow toward the leading end portion, the leading end portion of the burner having a larger diameter than the other portion of the burner; and wherein a burner supporting means is provided for supporting the burner with allowing adjustment of its position in the longitudinal direction relative to the rear wall portion of the air box, so as to variably adjust a ratio between the amount of primary air flowing through the primary air conduit and the amount of secondary air flowing through the secondary air conduit.

Namely, a portion of combustion air supplied from a combustion air supplying means is introduced from a rear end portion of the primary air conduit disposed inside the air box to flow through this primary air conduit as primary air. Also, a portion of combustion air supplied from the combustion air supplying means to the air box is caused to flow as secondary air through a second air conduit formed between the outer circumferential face of the leading end portion of the burner located inside the air box and the inner circumferential face of the tube section of the air box. Hence, the gas fuel flowing through the fuel conduit and discharged from the leading end of this fuel conduit is mixed with the primary air and the second air and combusted together.

Further, the position of the burner is adjusted in the longitudinal direction relative to the rear wall portion of the air box thereby to variably adjust the ratio between the amount of primary air flowing through the primary air conduit and the amount of secondary air flowing through the secondary air conduit. With this, the combustion state or mode of the burner can be switched over according to the use condition, e.g. between a combustion state wherein gas fuel discharged from the fuel conduit is used in a primary combustion sufficiently with a sufficient amount of primary air and a secondary combustion with a second air concurrently and a further combustion state wherein the fuel gas is used in a primary combustion with relatively less amount of primary air and a secondary combustion sufficiently with a secondary air concurrently.

That is, by adjusting the position of the burner along the longitudinal direction relative to the rear wall portion of the air box, it is possible to vary the amount of the leading end portion of the burner to be inserted into the tube section of the air box. And, in response to such change in the insertion amount of the burner leading end portion into the tube section of the air box, there occurs corresponding change in the flow resistance of the secondary air conduit formed between the outer circumferential face of the leading end portion of the burner and the inner circumferential face of the tube section. As a result, for the combustion air supplied into the air box, the ratio between the amount of the primary air flowing through the primary air conduit and the amount of the secondary air flowing through the secondary air conduit is adjustably varied.

And, since the portion of the burner located outside the air box forms the fuel conduit for flowing gas fuel, but need not form the primary air conduit, this portion can have a smaller diameter, whereby reduction of the installment space for the burner outside the furnace is made possible.

Moreover, while the arrangement provides the ability of adjustably varying the ratio between the amount of primary air flowing through the primary air conduit and the amount of secondary air flowing through the secondary air conduit, the arrangement requires, outside the furnace, only provision of the conduit for guiding combustion air from the combustion air supplying means to the air box. Hence, the configuration for supplying combustion air can be simplified and reduction is made possible in the installment space required for disposing this configuration for feeding combustion air outside the furnace.

Further, the arrangement for supporting the burner position-adjustably in its longitudinal direction relative to the rear wall portion of the air box is realized by a simple configuration. Also, as the rear wall portion of the air box is cooled by ambient air, it is possible to restrict the supporting means for supporting the burner to the rear wall portion of the air box being heated and damaged by combustion heat. Consequently, the ability of position adjustment of the burner along its longitudinal direction can be maintained for a long period of time.

Namely, for the purpose of adjustment of the ratio between the amount of primary air flowing through the primary air conduit provided at the leading end portion of the burner and the amount of secondary air flowing through the secondary air conduit formed between the outer circumferential face of the leading end portion of the burner and the inner circumferential face of the tube section, it is conceivable to form separately a conduit for guiding combustion air supplied from the combustion air supplying means into the air box to the primary air conduit and a conduit for guiding it to the secondary air conduit and to provide a damper inside the air box for adjusting the amounts of air to be guided from inside the air box to these respective conduits. However, with this conceivable arrangement, since the inside of the air box is divided for separate conduits formation and a damper is mounted inside the air box, the construction tends to be complicated. Further, since the damper is mounted inside the air box which is heated to a high temperature by combustion heat, this damper will be heated and damaged, so that it cannot be used favorably for a long period of time.

In short, according to the present invention, it is possible to provide a furnace-heating combustion apparatus that has the ability to adjust the ratio between the amount of primary air flowing through the primary air conduit and the amount of secondary air flowing through the secondary air conduit and that also can realize simplification of the configuration therefor as well as reduction in the installment space outside the furnace and that further can be used favorably for an extended period of time.

According to an embodiment of the present invention;

there is provided a fuel adjusting means for adjustably varying the amount of gas fuel to be supplied to the burner; and the combustion air supplying means is capable of adjustably varying the supply amount of combustion air.

Namely, as the amount of gas fuel to be supplied to the burner is adjusted by the fuel adjusting means and the supply amount of combustion air to be supplied from the combustion air supplying means is adjustably varied in accordance with this gas fuel supply amount adjustment, it becomes possible to vary the combustion amount of gas fuel while maintaining the condition for supplying the amount of air required for combustion of the supplied gas.

And, by adjusting the ratio between the amount of primary air flowing through the primary air conduit and the amount of secondary air flowing through the secondary air conduit in accordance with such variation of fuel gas combustion amount as above, it becomes possible to switch over, according to the use situation, between a combustion state wherein a large amount of gas fuel is subject to primary combustion with sufficient primary air and to secondary combustion with secondary air and a combustion state wherein the gas fuel is subject to primary combustion with a relatively small amount of primary air and to secondary combustion with sufficient secondary air, etc.

Therefore, it is possible to provide a furnace-heating combustion apparatus that allows switchover of various combustion states with varying the combustion amount.

According to an embodiment of the present invention: the burner includes:
- a fuel-supply tubular body provided over the whole length of the burner and forming the fuel conduit,
- a tubular conduit-forming body disposed to surround the leading end portion of the tubular body and forming the primary air conduit between this conduit-forming body and the tubular body and forming also the secondary air conduit between this conduit-forming body and the tube section of the air box, and
- a flame stabilizing baffle disposed between a rear end portion of the conduit-forming body and the fuel-supply tubular body and defining an air passing hole for introducing the primary air.

Namely, the burner is configured to have its conduit-forming body surround the leading end portion of the fuel-supply tubular body forming the fuel conduit.

And, since there is provided a flame stabilizing baffle disposed between a rear end portion of the conduit-forming body and the fuel-supply tubular body and defining an air passing hole for introducing the primary air, when the gas combustion amount is small, the gas fuel can be combusted in a favorable manner with flame being stabilized by the flame stabilizing baffle.

Further, when the gas combustion amount is large, a large amount of gas fuel can be combusted with flame being stabilized at the tube section of the air box.

As described above, gas fuel can be combusted with changing the mode of flame stabilization between the case of large gas combustion amount and small gas combustion amount. Therefore, even if the gas combustion amount is varied over a wide range, combustion can take place in a favorable manner. In other words, the gas combustion amount can be varied over a wide range.

Therefore, it is possible to provide a furnace-heating combustion apparatus that allows changing of gas combustion amount over a wide range.

According to an embodiment of the present invention, to the rear wall portion of the air box, there is mounted a tubular burner support body to which the burner is engaged to be movable along the longitudinal direction; and there is provided a positioning body capable of switching over between a position-fixed state in which the burner is fixed in position relative to the burner support body and a released state in which the position fixing is released; and said burner supporting means comprises a means for causing the burner support body to support the burner with the burner being movable along the longitudinal direction and causing the positioning body to position-fix the longitudinal movement of the burner.

That is, through a procedure of switching the positioning body to the released state for releasing the position fixing of the burner and adjustably moving the burner along the longitudinal direction relative to the tubular burner support body provided to the rear wall portion of the air box and bringing the positioning body to the position fixing state, it is possible to adjust the longitudinal position of the burner, namely, the ratio between the amount of primary air flowing through the primary air conduit and the amount of secondary air flowing through the secondary air conduit.

Incidentally, the positioning body can be a pressing bolt threadingly engageable with the burner support body along its radial direction for pressing the outer face of the burner.

As described above, the adjustment of longitudinal movement of the burner is realized by the simple arrangement of providing a tubular burner support body and a positioning body. Hence, through the simplification of the burner supporting means, the whole arrangement can be formed simple.

Further, providing the tubular burner support body to the rear wall portion of the air box can be readily done also to an existing air box. Hence, it is possible to modify an existing apparatus to include a burner supporting means. Namely, it is possible to retrofit an existing apparatus into the inventive apparatus.

Therefore, it is possible to provide a furnace-heating combustion apparatus that allows not only simplification of the whole arrangement but also retrofitting an existing apparatus into the inventive apparatus.

According to an embodiment of the present invention, preferably, there is provided a preheating means for preheating the combustion air supplied from the combustion air supplying means with exhaust gas discharged from inside the furnace.

Namely, as the preheating means preheats the combustion air supplied from the combustion air supplying means with exhaust gas discharged from inside the furnace, the inside of the furnace can be heated to a high temperature in an efficient manner.

Incidentally, in case the combustion air is preheated as described above, the temperature of the inside of the air box becomes even higher. However, since the rear wall portion of the air box is cooled by ambient air, even when the combustion air is preheated, it is still possible to restrict heating and resultant damaging of the supporting means for supporting the burner to the rear wall portion of the air box, so that the longitudinal position adjustment of the burner can be made in a favorable manner for an extended period of time.

Consequently, there can be provided a furnace-heating combustion apparatus that can heat the inside of the furnace to a high temperature in an efficient manner.

BRIEF DESCRIPTION OF THE DRAWINGS

FIG. 6 is a rear view in vertical section of a base end portion of the burner.

MODE OF EMBODYING THE INVENTION

Description of the Invention

Next, an embodiment of a furnace-heating combustion apparatus relating to the present invention will be described with reference to the accompanying drawings.

Figure 1:
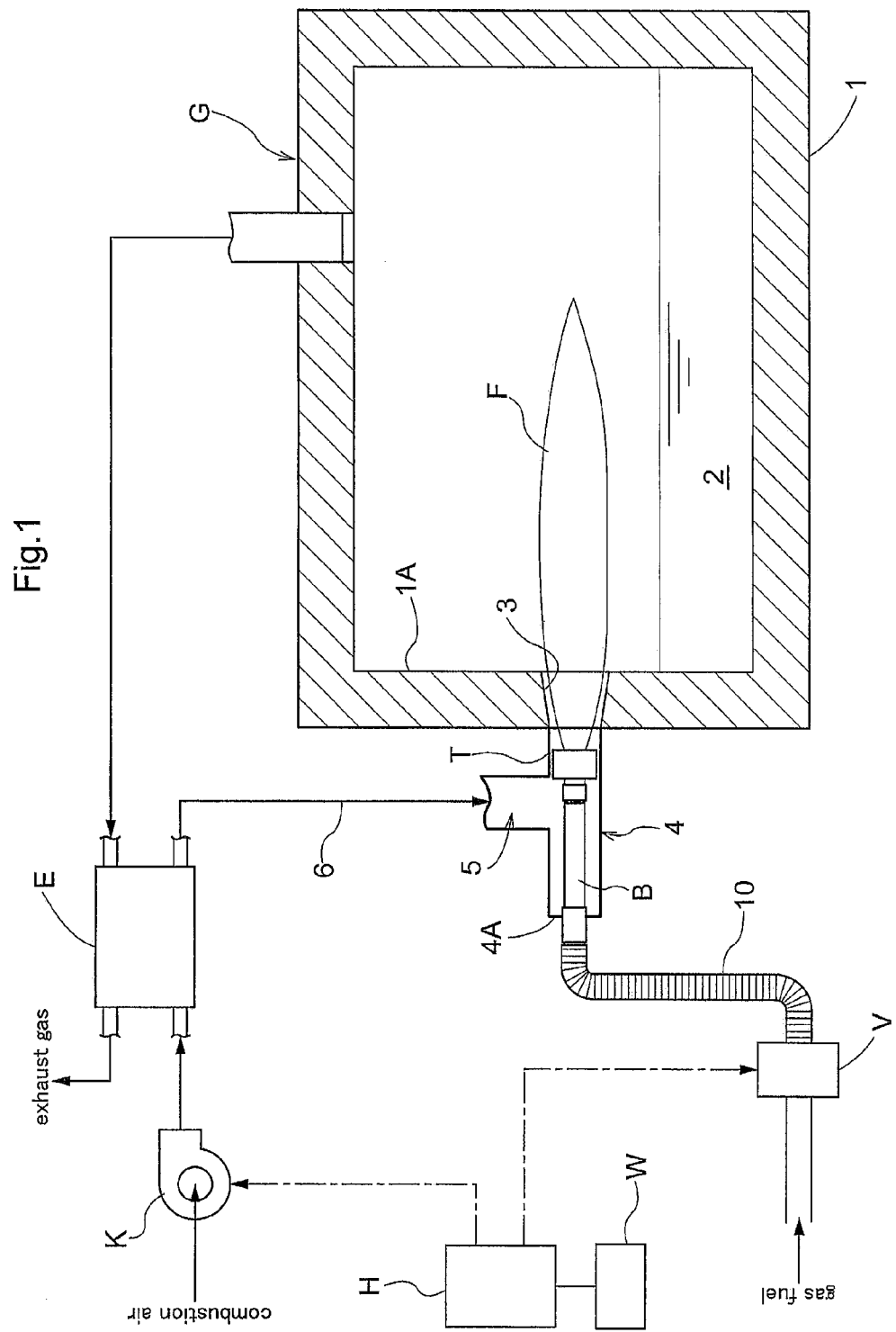
FIG. 1 is a schematic side view of a furnace-heating combustion apparatus.

The furnace-heating combustion apparatus according to the instant embodiment is exemplified for use in heating a glass melting furnace G as shown in FIG. 1.

That is, the glass melting furnace G is configured to include a melting tank 2 at the lower portion of the inside of a furnace body 1. And, the furnace-heating combustion apparatus is configured to combust gas fuel in such a manner that a laterally (i.e. horizontally) oriented flame F is formed in the interior of the furnace upwardly of the melting tank 2.

Figure 2:
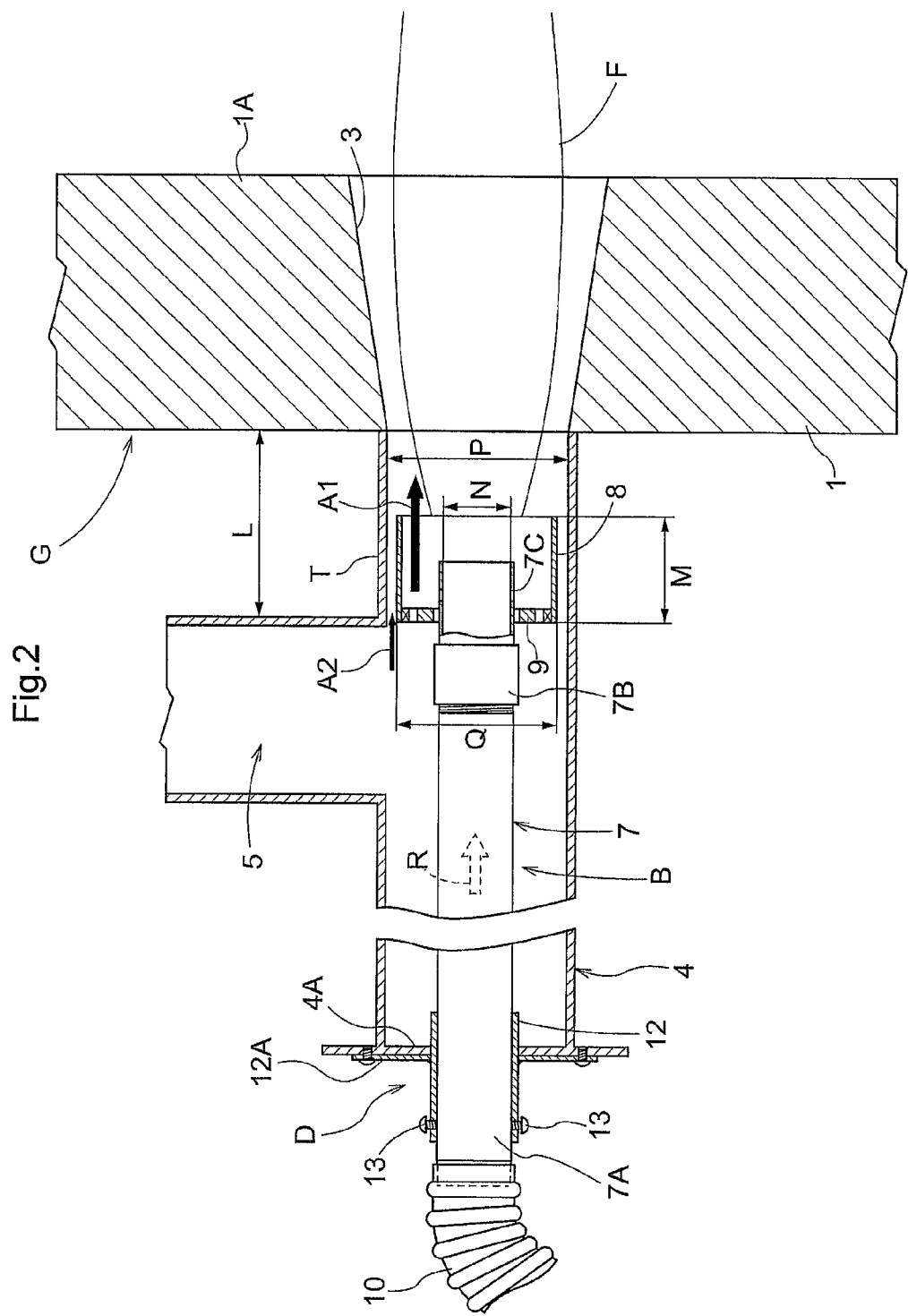
FIG. 2 is a cutaway side view of a burner mount portion.

The furnace-heating combustion apparatus, as shown also in FIG. 2, includes an elongate burner B having a double-tube having, at its center portion, a fuel conduit R for flowing gas fuel and having, at its outer circumferential portion, a primary air conduit A1 for flowing primary air, an air box 4 connected to a furnace wall 1A of a furnace body 1 to be communicated with a flame passing hole 3 defined in the furnace wall 1A, and a blower fan K as a combustion air supplying means for supplying combustion air to the air box 4 through an air conduit 6.

The air conduit 6 incorporates a heat exchanger unit E as a preheating means for preheating the combustion air supplied from the blower fan K with exhaust gas discharged from the inside of the furnace, so that the combustion air is preheated to e.g. 600° C. thereby to achieve an in-furnace temperature of 1000° C.

The air box 4, as a whole, has a tubular structure disposed under a transversely laid posture (i.e. horizontally extending posture) and has its rear portion closed at a rear wall portion 4A located on the side away from the furnace wall 1A. And, a combustion air inlet opening 5 is formed at its upper portion. And, the leading end portion of the air box 4 on the side adjacent the furnace wall is configured as a cylindrical tube section T connected to the furnace wall 1A. Here, the tube section T is defined as a tubular portion disposed between the outer face of the furnace wall 1A and a point of a combustion air inlet opening 5 closest to the outer face of the furnace wall 1A.

Figure 3:
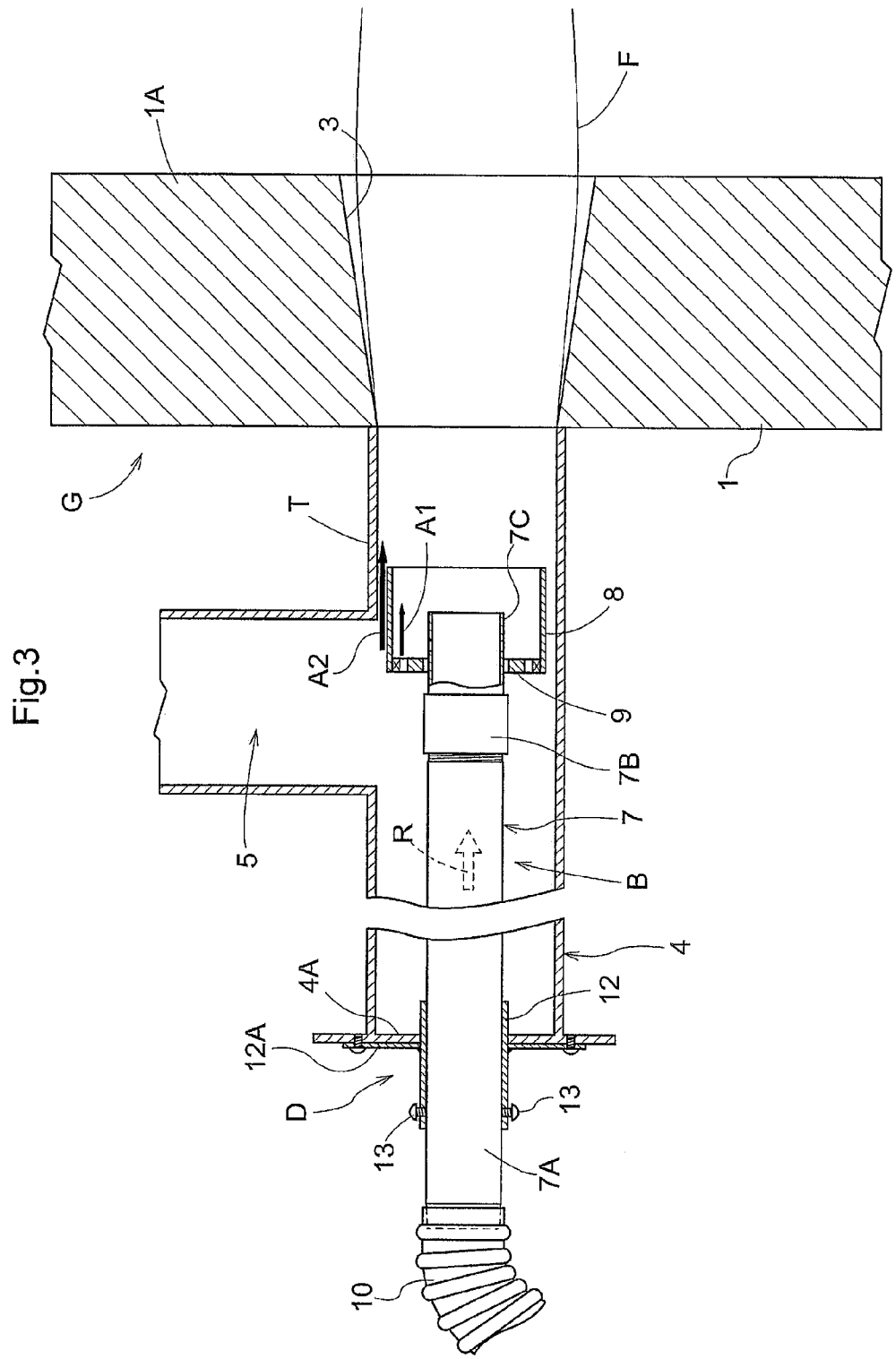
FIG. 3 is a cutaway side view of the burner mount portion.

As shown in FIG. 2 and FIG. 3, the burner B is disposed to extend through the rear wall portion 4A of the air box 4, and is disposed inside the air box 4, with its leading end portion forming, between its outer circumferential face and the inner circumferential face of the tube section T of the air box 4, a secondary air duct A2 for flowing an amount of air present inside the air box as secondary air.

And, the leading end portion of the burner B has a larger diameter than the other portion of the burner B. A primary air conduit A1 included in the burner B is provided, at the leading end portion of the burner B, in such a manner that the air inside the air box is introduced through a rear end portion of a conduit forming body 8 to be explained later and is caused to flow toward the leading end portion.

Figure 4:
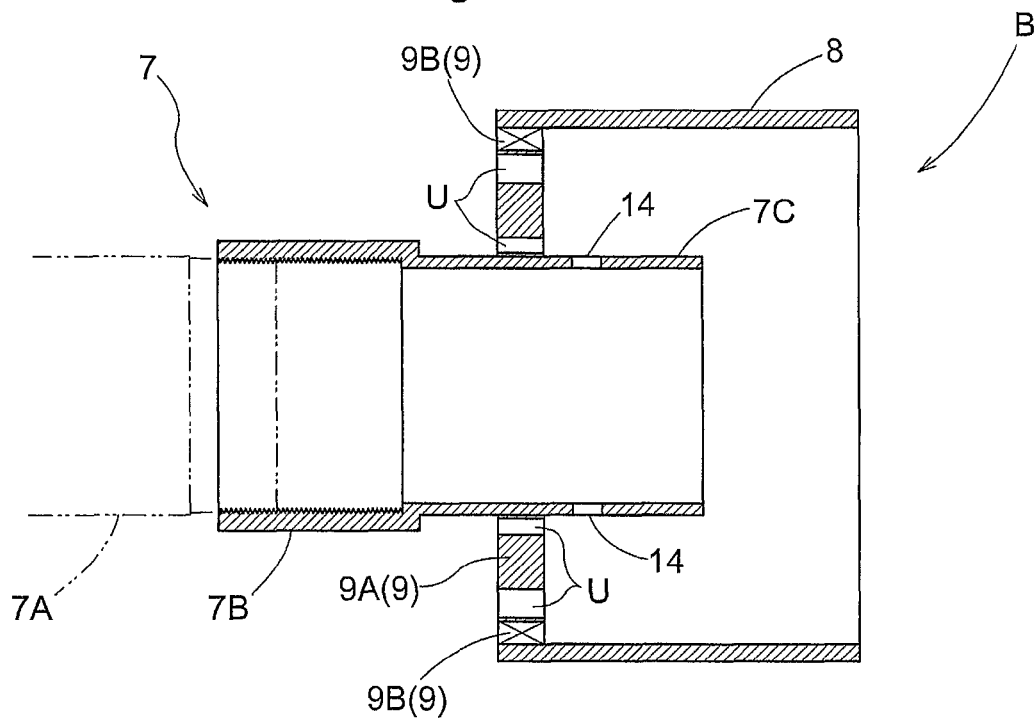
FIG. 4 is a side view in vertical section of a leading end portion of the burner.
Figure 5:
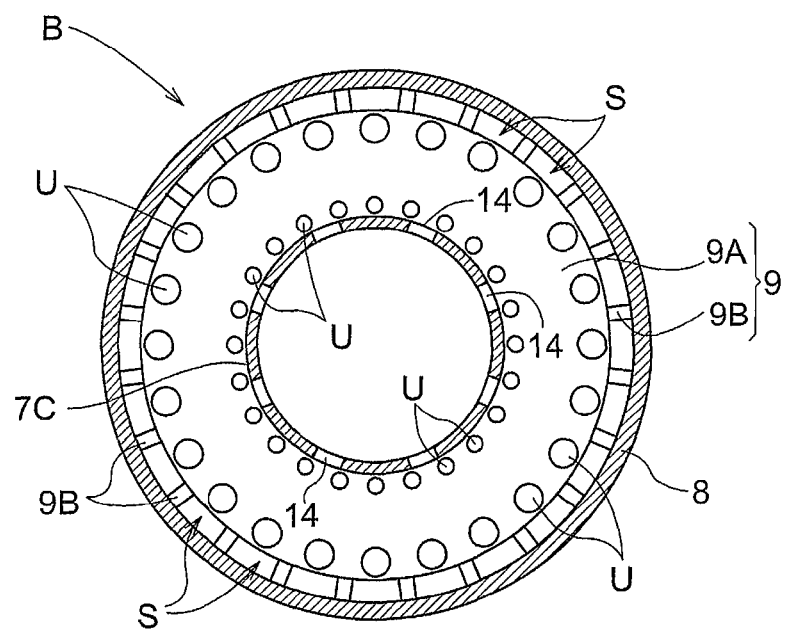
FIG. 5 is a front view in vertical section of the leading end portion of the burner.

Referring additionally to the burner B with reference to FIGS. 4 and 5, the burner B includes a fuel-supply tubular body 7 provided over the whole length of the burner B and forming the fuel conduit R, a tubular conduit-forming body 8 disposed to surround the leading end portion of the tubular body 7 and forming the primary air conduit A1 between this conduit-forming body 8 and the tubular body 7 and forming also the secondary air conduit A2 between this conduit-forming body 8 and the tube section T of the air box 4 and a flame stabilizing baffle 9 disposed between a rear end portion of the conduit-forming body 8 and the tubular body 7 and defining air passing holes S for introducing the primary air.

The tubular body 7 includes a base end side tubular body 7A, an intermediate tubular body 7B fitted on the leading end of this base end side tubular body 7A and a leading end tubular body 7C connected to the intermediate tubular body 7B. To the rear end portion of the base end side tubular body 7A, there is connected a gas fuel supply tube 10 for supplying gas fuel.

Incidentally, the intermediate tubular body 7B, the leading end tubular body 7C and the flame stabilizing baffle 9 are formed integral as a nozzle and the intermediate tubular body 7B of the nozzle is threadingly fitted on the base end side tubular body 7A.

Incidentally, the gas fuel supply tube 10 is comprised of a flexible tube to be flexible for allowing position adjustment of the burner B along its longitudinal direction.

The flame stabilizing baffle 9 is comprised of an annular plate body 9A fitted on the leading end tubular body 7C of the tubular body 7 and a plurality of support bodies 9B spaced from each other along the outer circumferential direction of the plate body 9A and connecting this plate body 9A with the conduit forming body 8. And, an air passing hole S is formed between the plate body 9A and the conduit forming body 8 and between adjacent support bodies 9B.

Incidentally, in the inner peripheral edge portion and the outer peripheral edge portion of the plate body 9A, there are formed cooling holes U for flowing air for cooling for the purpose of preventing burn of the flame stabilizing baffle 9. Further, in the leading end tubular body 7C adjacent the plate body 9A, a plurality of discharge holes 14 for discharging gas fuel into the primary air conduit A1 are formed to be spaced apart from each other along the circumferential direction so as to improve the flame stabilizing performance.

As shown in FIG. 1, a fuel adjusting valve V is provided as a fuel adjusting means for variably adjusting the amount of gas to be supplied to the burner B. Also, the blower fan K is configured to be capable of variably adjusting its rotational speed so as to variably adjust the combustion air supply amount.

To the fuel adjusting valve V and the blower fan K, there is connected a controlling means H for controlling these components. This controlling means H is configured to effect an opening degree adjustment of the fuel adjusting valve V and the speed adjustment of the blower fan K in order to supply the burner B with an amount of fuel corresponding to a combustion amount set by a combustion amount setter W and to supply the air box 4 with an amount of combustion air corresponding to the set combustion amount. The controlling means H includes a CPU, a memory, a communication unit and stores in its memory an algorithm for executing the functions provided in the controlling means H.

As shown in FIG. 2, FIG. 3 and FIG. 6, a burner supporting means D is provided for supporting the burner B to the rear wall portion 4A of the air box 4, with allowing adjustment of its position along the longitudinal direction in order to variably adjust the ratio between the amount of primary air flowing through the primary air conduit A1 and the amount of secondary air flowing through the secondary air conduit A2.

Referring thereto more particularly, to the rear wall portion 4A of the air box 4, there is mounted a tubular burner support body 12 to which the burner B is engaged to be movable along its longitudinal direction, with an annular plate portion 12A attached to its outer side being fixed to the rear wall portion 4A by means of bolts. And, each as a positioning body capable of switching over a position fixing state for fixing the burner in position relative to the burner support body 12 and a releasing state for releasing the position fixation, there are provided pressing bolts 13 threadingly engaged with the burner support body 12 to be movable along its radial direction so as to press the outer face of the burner.

And, the burner supporting means D is configured as a means for supporting the burner B with allowing this burner B to be movable along its longitudinal direction and position-fixing the movement of the burner B along the longitudinal direction by the pressing bolts 13.

Incidentally, though not exemplified, in the outer face of the tubular body 7 of the burner B, there are provided indices spaced apart along its longitudinal direction. In operation, by confirming the position of the burner B in the longitudinal direction relative to the burner support body 12 with using these indices as reference, it is possible to recognize the amount of insertion of the leading end portion of the burner B into the tube section T of the air box 4.

Incidentally, as shown in FIG. 2, in the instant embodiment, there is shown an exemplary arrangement as follows. Namely, the inner diameter of the tube section T of the air box 4 is 200 mm. The outer diameter of the leading end portion of the burner B, that is, the outer diameter Q of the conduit forming body 8 is about 190 mm. The length M of the conduit forming body 8 is about 110 mm. The inner diameter N of the leading end tubular body 7C of the tubular body 7 is 80 mm. The length L of the tube section T is about 200 mm. However, the sizes of the respective portions can vary in many ways as needed.

Yet, it is preferred that the ratio of the outer diameter Q of the conduit forming body 8 relative to the inner diameter P of the tube section T (Q/P) be set to from 0.8 to 0.95. And, it is also preferred that the length M of the conduit forming body 8 be set to a length ranging from ½ to ¾ of the inner diameter P of the tube section T.

Further, in the instant embodiment, the flow rate of the gas fuel is set to the range from 50 to 100 $Nm^3/H$. And, in correspondence therewith, the flow rate of the combustion air is set to the range from about 600 to 1200 $Nm^3/H$. And, through the longitudinal position adjustment of the burner B, the insertion length of the leading end portion of the burner B into the tube section T is varied over the range between the state wherein the entire leading end portion of the burner B is inserted into the tube section T as shown in FIG. 2 and a further state wherein a half of the length M of the leading end portion of the burner B is inserted into the tube section T.

Next, an example of method of operating the furnace-heating combustion apparatus described above will be explained.

When the gas fuel supply amount is small, that is, when the flow rate of the gas fuel is small, there is provided the state wherein the entire leading end portion of the burner B is inserted into the tube section T to make it more difficult for the combustion air to flow through the secondary air conduit A2, whereby the combustion air is caused to flow sufficiently through the primary air conduit A1 and the gas fuel can be combusted with effective flame stabilization by the flame stabilizing baffle 9.

On the other hand, when the gas fuel supply amount is large, that is, when the flow rate of the gas fuel is large, there is provided the state wherein the half of the length M of the leading end portion of the burner B is inserted into the tube section T to make it easier for the combustion air to flow through the secondary air conduit A2, whereby the combustion air is caused to flow sufficiently through the secondary air conduit A2 and the gas fuel can be combusted with effective flame stabilization at the tube section T of the air box 4.

Incidentally, in the case of this operation method, the length of the flame F becomes longer or shorter depending on the amount of gas fuel supply, but regardless of the varying supply amount of the gas fuel, the temperature of the leading end portion of the flame F can be rendered high.

Other Embodiments

Next, other embodiments will be described.

(1) In the foregoing embodiment, there was exemplified a case wherein the inventive furnace-heating combustion apparatus is applied to a glass melting furnace G. However, the furnace-heating combustion apparatus according to the present invention may be applied to various kinds of heating furnace such as a forging furnace, etc.

(2) In the foregoing embodiment, there was exemplified a case wherein the burner supporting means D is constituted of the tubular burner support body 12 to which the burner B is engaged to be movable along the longitudinal direction and the positioning body 13. However, the specific configuration of the burner supporting means D can vary in many ways as needed. For instance, if the friction between the burner support body 12 and the burner B is sufficiently large, the positioning body is not absolutely needed. Further, as the positioning body, it is possible to utilize resin, rubber disposed between the burner support body 12 and the burner B or other material that increases the friction coefficient.

(3) In the foregoing embodiment, there was exemplified a case wherein the insertion length of the leading end portion of the burner B into the tube section T is varied over the range between the state wherein the entire leading end portion of the burner B is inserted into the tube section T and the further state wherein a half of the length M of the leading end portion of the burner B is inserted into the tube section T. However, the range of varying the insertion length of the leading end portion of the burner B into the tube section T through adjustment of the longitudinal position of the burner B can vary in many ways depending on the purpose of use. For instance, the length may be varied over the range between the state wherein the entire leading end portion of the burner B is inserted into the tube section T and a further state wherein only the leading end portion of the burner B is inserted into the tube section T.

(4) In the foregoing embodiment, there was exemplified a case wherein the flame passing hole 3 is formed with a greater diameter on the inner side of the furnace. However, the shape of the flame passing hole 3 can vary in many ways, such as a straight cylindrical shape. Further, in the foregoing embodiment, there was exemplified a case wherein the flame passing hole 3 is formed in the furnace wall 1A. In general, however, a burner tile defining the flame passing hole 3 will be provided in the furnace wall 1A.

(5) In the foregoing embodiment, there was exemplified a case wherein one burner B is provided for the furnace body 1. In general, however, a plurality of burners B will be provided for the furnace body 1.

And, in case a plurality of burners B are provided, it is not absolutely needed to adjust the combustion amount of the plurality of burners B altogether in a same way, but the burners B may be adjusted to effect combustion with different combustion amounts.

(6) In the foregoing embodiment, there was exemplified a case wherein the flame stabilizing baffle 9 is constituted of the plate body 9A and the support bodies 9B. However, the specific configuration of the flame stabilizing baffle 9 may vary in many ways. For instance, the flame stabilizing baffle 9 may be comprised of a single plate-like body defining the air passing holes S provided by cutting-out of the outer circumferential portion or hole forming.

INDUSTRIAL APPLICATION

The furnace-heating combustion apparatus according to the present invention may be used for heating various types of furnaces such as a melting furnace for melting an object to be melted such as glass, metal or the like or a heating furnace for heating an object to be heated such as a forged article.

The invention claimed is:

1. A furnace-heating combustion apparatus comprising:
an air box for connecting to a furnace wall to be communicated with a flame passing hole formed in the furnace wall, the air box including a cylindrical tube section for connecting to the furnace wall and receiving a supply of combustion air from a combustion air supplier; and
an elongate burner in the form of a double-tube having, at a center portion thereof, a fuel conduit for flowing gas fuel and having, at an outer circumferential portion thereof, a primary air conduit for flowing primary air, the elongate burner being provided to extend through a rear wall portion of the air box disposed away from the furnace wall;
wherein a leading end portion of the burner is disposed inside the air box in such a manner that a secondary air conduit for flowing the combustion air present inside the air box as secondary air is formed between the outer circumferential face of the leading end portion of the burner and an inner circumferential face of the tube section;
wherein a combustion air inlet opening is formed in a side portion of the air box adjacent the tube section for receiving the combustion air from the combustion air supplier,
wherein the cylindrical tube section of the air box is formed between an external surface of the furnace wall and an end portion of the combustion air inlet opening adjacent to the furnace wall,
wherein the primary air conduit included in the burner is provided at the leading end portion of the burner in such a manner as to introduce the combustion air present inside the air box as the primary air and cause it to flow toward the leading end portion, the leading end portion of the burner having a cylindrical shape with a larger diameter than the other portion of the burner, the entire leading end portion of the burner being insertable into the tube section; and
wherein a burner support is provided for supporting the burner and allowing adjustment of its position in the longitudinal direction relative to the rear wall portion of the air box, so as to vary the amount of the leading edge portion of the burner to be inserted into the tube section and variably adjust a ratio between the amount of primary air flowing through the primary air conduit and the amount of secondary air flowing through the secondary air conduit.

2. The furnace-heating combustion apparatus according to claim 1, wherein:
there is provided a fuel adjustor for adjustably varying the amount of gas fuel to be supplied to the burner; and
the combustion air supplier is capable of adjustably varying the supply amount of combustion air.

3. The furnace-heating combustion apparatus according to claim wherein:
the burner includes:
a fuel-supply tubular body provided over the whole length of the burner and forming the fuel conduit,
a tubular conduit-forming body disposed to surround the leading end portion of the tubular body and forming the primary air conduit between this conduit-forming body and the tubular body and forming also the secondary air conduit between this conduit-forming body and the tube section of the air box, and
a flame stabilizing baffle disposed between a rear end portion of the conduit-forming body and the fuel-supply tubular body and defining an air passing hole for introducing the primary air.

4. The furnace-heating combustion apparatus according to claim 3, wherein:
to the rear wall portion of the air box, there is mounted a tubular burner support body to which the burner is engaged to be movable along the longitudinal direction;
there is provided a positioning body capable of switching over between a position-fixed state in which the burner is fixed in position relative to the burner support body and a released state in which the position fixing is released; and
the burner support engages the burner support body to support the burner with the burner being movable along the longitudinal direction and causing the positioning body to position-fix the longitudinal movement of the burner.

5. The furnace-heating combustion apparatus according to claim 3, wherein there is provided a preheater for preheating the combustion air supplied from the combustion air supplier with exhaust gas discharged from inside the furnace.

6. The furnace-heating combustion apparatus according to claim 2, wherein:
to the rear wall portion of the air box, there is mounted a tubular burner support body to which the burner is engaged to be movable along the longitudinal direction;
there is provided a positioning body capable of switching over between a position-fixed state in which the burner is fixed in position relative to the burner support body and a released state in which the position fixing is released; and
the burner support engages the burner support body to support the burner with the burner being movable along the longitudinal direction and causing the positioning body to position-fix the longitudinal movement of the burner.

7. The furnace-heating combustion apparatus according to claim 2, wherein there is provided a preheater for preheating the combustion air supplied from the combustion air supplier with exhaust gas discharged from inside the furnace.

8. The furnace-heating combustion apparatus according to claim 1, wherein:
to the rear wall portion of the air box, there is mounted a tubular burner support body to which the burner is engaged to be movable along the longitudinal direction;
there is provided a positioning body capable of switching over between a position-fixed state in which the burner is fixed in position relative to the burner support body and a released state in which the position fixing is released; and
the burner support engages the burner support body to support the burner with the burner being movable along the longitudinal direction and causing the positioning body to position-fix the longitudinal movement of the burner.

9. The furnace-heating combustion apparatus according to claim 1, wherein there is provided a preheater for preheating the combustion air supplied from the combustion air supplier with exhaust gas discharged from inside the furnace.

* * * * *

UNITED STATES PATENT AND TRADEMARK OFFICE
CERTIFICATE OF CORRECTION

PATENT NO.         : 9,677,760 B2
APPLICATION NO.    : 13/981751
DATED              : June 13, 2017
INVENTOR(S)        : Makoto Hirano It is certified that error appears in the above-identified patent and that said Letters Patent is hereby corrected as shown below:

On the Title Page

Column 1, Line 1, Item (54) Title, delete "Furnace Heating" and insert -- Furnace-Heating --

In the Claims

Column 12, Line 2, Claim 3, delete "claim" and insert -- claim 2, --

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*